US 10,853,863 B2

(12) United States Patent
Pathak et al.

(10) Patent No.: US 10,853,863 B2
(45) Date of Patent: Dec. 1, 2020

(54) SYSTEMS AND METHODS FOR BROWSE FACET RANKING

(71) Applicant: Wal-Mart Stores, Inc., Bentonville, AR (US)

(72) Inventors: Manas Pathak, Sunnyvale, CA (US); Onur Gungor, Sunnyvale, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 601 days.

(21) Appl. No.: 15/011,498

(22) Filed: Jan. 30, 2016

(65) Prior Publication Data
US 2017/0221120 A1   Aug. 3, 2017

(51) Int. Cl.
G06Q 30/00   (2012.01)
G06Q 30/06   (2012.01)
G06F 16/2457  (2019.01)
G06F 16/951   (2019.01)
G06F 16/338   (2019.01)

(52) U.S. Cl.
CPC ... G06Q 30/0625 (2013.01); G06F 16/24578 (2019.01); G06F 16/338 (2019.01); G06F 16/951 (2019.01); G06Q 30/0643 (2013.01)

(58) Field of Classification Search
None
See application file for complete search history.

(56) References Cited

U.S. PATENT DOCUMENTS

| | | | |
|---|---|---|---|
| 7,814,085 B1 * | 10/2010 | Pfleger | G06F 17/30864 707/708 |
| 8,983,930 B2 | 3/2015 | Cheng et al. | |
| 9,594,540 B1 * | 3/2017 | Stasior | G06F 7/00 |
| 10,585,931 B1 * | 3/2020 | Young | G06F 16/45 |
| 2011/0154239 A1 * | 6/2011 | Dheap | G06Q 30/02 715/771 |
| 2012/0016873 A1 * | 1/2012 | Mathieson | G06F 17/3053 707/727 |

(Continued)

OTHER PUBLICATIONS

Zheng Qin, "Introduction to E-commerce", 2009, Springer, springer.com (Year: 2009).*

(Continued)

Primary Examiner — Naeem U Haq
Assistant Examiner — Norman Donald Sutch, Jr.
(74) Attorney, Agent, or Firm — Bryan Cave Leighton Paisner LLP

(57) ABSTRACT

In some embodiments, a method can comprise receiving a query and determining one or more results for the query. In many embodiments, the one or more results can comprise one or more shelves, each shelf of the one or more shelves can comprise one or more facets, and each facet of the one or more facets can comprise one or more items. In various embodiments, the method can further comprise facilitating display of at least a portion of the one or more results for the query by facilitating display of at least the portion of the one or more results in a ranked order. In many embodiments, displaying the portion of the one or more results in a ranked order can comprise determining a composite score for each facet of the one or more facets of each shelf of the one or more shelves. Other embodiments of related methods and systems are also provided.

20 Claims, 8 Drawing Sheets

(56) References Cited

U.S. PATENT DOCUMENTS

| | | | |
|---|---|---|---|
| 2012/0030152 A1* | 2/2012 | Pueyo | G06F 17/30867 |
| | | | 706/12 |
| 2012/0072432 A1* | 3/2012 | Crosa | G06F 17/30867 |
| | | | 707/748 |
| 2012/0226681 A1* | 9/2012 | Paparizos | G06F 17/3053 |
| | | | 707/723 |
| 2012/0254162 A1 | 10/2012 | Asadullah et al. | |
| 2013/0226916 A1* | 8/2013 | Dredze | G06F 17/3053 |
| | | | 707/727 |
| 2014/0201646 A1* | 7/2014 | Scherpa | G06F 3/048 |
| | | | 715/744 |
| 2014/0258277 A1* | 9/2014 | Cheng | G06F 17/30424 |
| | | | 707/723 |
| 2015/0095108 A1* | 4/2015 | Savelli | G06F 16/24578 |
| | | | 705/7.29 |
| 2015/0339754 A1* | 11/2015 | Bloem | G06F 17/30867 |
| | | | 705/26.7 |
| 2016/0125498 A1* | 5/2016 | Setty | G06F 16/23 |
| | | | 705/26.63 |

OTHER PUBLICATIONS

Wisam Dakka; "Faceted Searching and Browsing Over Large Collections of Textual and Text-Annotated Objects"; 2009; Columbia University (Year: 2009).*

* cited by examiner

SYSTEMS AND METHODS FOR BROWSE FACET RANKING

TECHNICAL FIELD

This disclosure relates generally to systems and methods for browse facet ranking, and relates more particularly to systems to rank facets and select a portion of the facets for display, and related methods.

BACKGROUND

Currently many electronic commerce websites (eCommerce) only have a portion of the facets for each browse page ordered. In many cases, these facets are ordered manually. However, manual ordering is time consuming, not scalable and cannot be updated quickly enough to respond to customer or user behavior. Accordingly, there is a need for systems and methods to provide efficient browsing of facets.

BRIEF DESCRIPTION OF THE DRAWINGS

To facilitate further description of the embodiments, the following drawings are provided in which:

To facilitate further description of the embodiments, the following drawings are provided in which:

FIG. 8 illustrates an example browse page of an eCommerce website, according to an embodiment.

Figure 1:
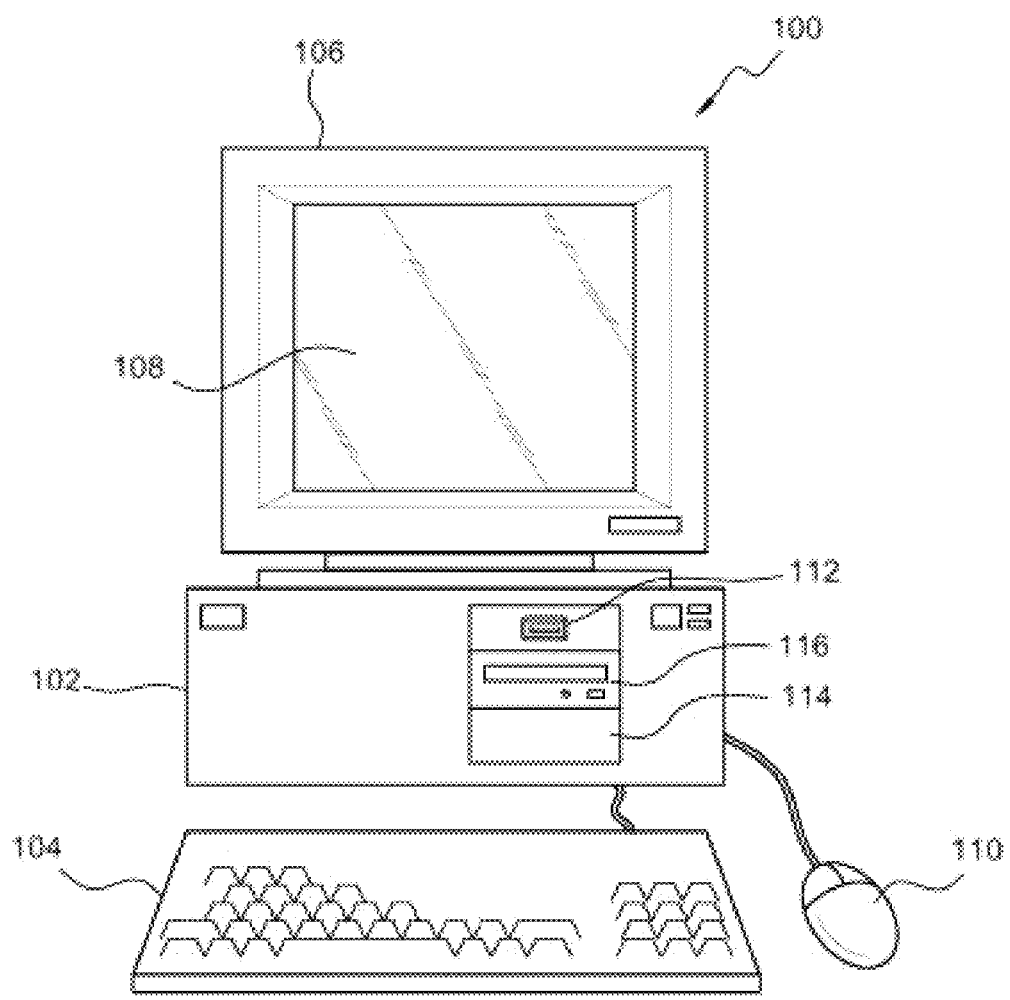
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing module and one or more non-transitory storage modules storing computing instructions configured to run on the one or more processing modules and perform the acts of receiving a query and determining one or more results for the query. In many embodiments, the one or more results can comprise one or more shelves, each shelf of the one or more shelves comprising one or more facets and each facet of the one or more facets comprising one or more items. In some embodiments, the one or more non-transitory storage modules storing computing instructions are further configured to run on the one or more processing modules and perform the acts of facilitating display of at least a portion of the one or more results for the query by facilitating display of at least the portion of the one or more results in a ranked order, ranking the one or more facets based at least in part on the composite score for each facet of the one or more facets, and selecting at least a portion of the one or more facets for display based at least in part on the ranking of the one or more facets. In various embodiments, displaying the portion of the one or more results in a ranked order can comprise determining a composite score for each facet of one or more facets of each shelf of the one or more shelves by analyzing user activity with each facet of the one or more facets, determining a facet click score for each facet of the one or more facets based at least in part on the analysis, determining an item click score for each facet of the one or more facets based at least in part on the analysis, determining an item add-to-cart score for each facet of the one or more facets based at least in part on the analysis, and determining an item order score for each facet of the one or more facets based at least in part on the analysis.

Some embodiments include a method. In some embodiments, a method can comprise receiving a query and determining one or more results for the query. In many embodiments, the one or more results can comprise one or more shelves, each shelf of the one or more shelves can comprise one or more facets and each facet of the one or more facets can comprise one or more items. In various embodiments, the method can further comprise facilitating display of at least a portion of the one or more results for the query by facilitating display of at least the portion of the one or more results in a ranked order. In many embodiments, facilitating display of at least the portion of the one or more results in a ranked order can comprise determining a composite score for each facet of the one or more facets of each shelf of the one or more shelves, ranking the one or more facets based at least in part on the composite score for each facet of the one or more facets, and selecting at least a portion of the one or more facets for display based at least in part on the ranking of the one or more facets. In some embodiments, determining the composite score for each facet of the one or more facets of each shelf of the one or more shelves can comprise analyzing user activity with each facet of the one or more facets, determining a facet click score for each facet of the one or more facets based at least in part on the analysis, determining an item click score for each facet of the one or more facets based at least in part on the analysis, determining an item add-to-cart score for each facet of the one or more facets based at least in part on the analysis, and determining an item order score for each facet of the one or more facets based at least in part on the analysis.

Figure 2:
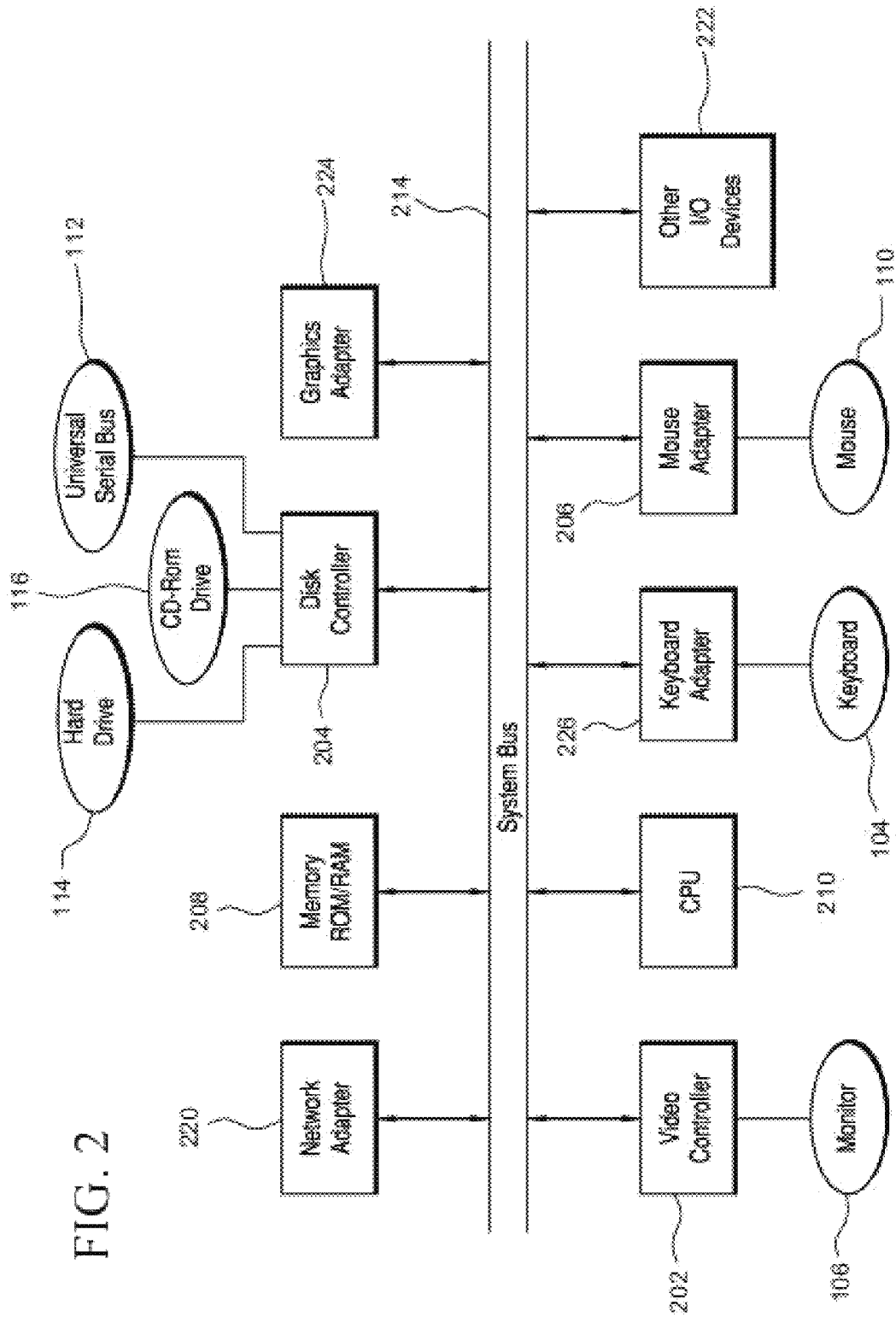
FIG. 2 illustrates a representative block diagram of exemplary elements included on the circuit boards inside a chassis of the computer system of FIG. 1.

Various embodiments of systems and methods for browse facet ranking can include a method. In many embodiments, the method can comprise determining a composite score for each facet of one or more facets of a shelf, ranking the one or more facets based at least in part on the composite score for each facet of the one or more facets, selecting at least a portion of the one or more facets for display based at least in part on the ranking of the one or more facets, and facilitating display of at least the portion of the one or more facets. In some embodiments, determining the composite score for each facet of the one or more facets of the shelf can comprise analyzing user activity with each facet of the one or more facets, determining a facet click score for each facet of the one or more facets based at least in part on the analysis, determining an item click score for each facet of the one or more facets based at least in part on the analysis, determining an item add-to-cart score for each facet of the one or more facets based at least in part on the analysis, and determining an item order score for each facet of the one or more facets based at least in part on the analysis;

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
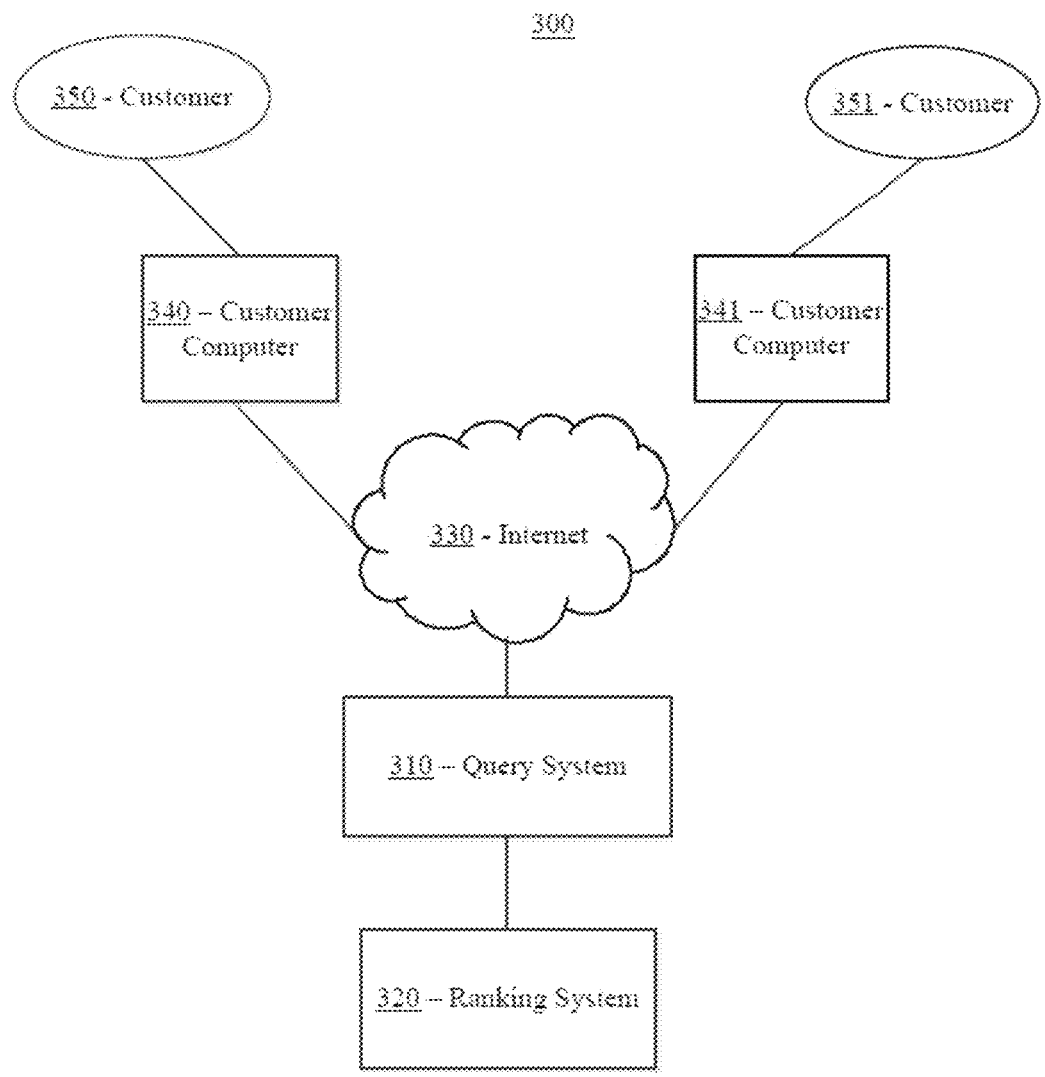
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise a query system 310 and a ranking system 320. In some embodiments, query system 310 and ranking system 320 can each be a computer system 100 (FIG. 1), as described above, and can each be a single computer, a single server, or a cluster or collection of computers or servers. In some embodiments, query system 310 can be in communication with an inventory system (not shown) which can track distinct items (e.g., stock keeping units (SKUs)) which can be ordered through the online retailer and which can be housed at one or more warehouses. In many embodiments, warehouses can comprise brick-and-mortar stores, distribution centers, or other storage facilities.

In many embodiments, query system 310, and/or ranking system 320 can each comprise one or more input devices (e.g., one or more keyboards, one or more keypads, one or more pointing devices such as a computer mouse or computer mice, one or more touchscreen displays, etc.), and/or can each comprise one or more display devices (e.g., one or more monitors, one or more touch screen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of query system 310 and/or ranking system 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of query system 310 and/or ranking system 320. In a similar manner, the processing module(s) and the memory storage module(s) can be local and/or remote to each other.

In many embodiments, query system 310 can be configured to communicate with one or more customer computers 340 and 341. In some embodiments, customer computers 340 and 341 also can be referred to as user computers. In some embodiments, query system 310 can communicate or interface (e.g. interact) with one or more customer computers (such as customer computers 340 and 341) through a network or internet 330. Internet 330 can be an intranet that is not open to the public. Accordingly, in many embodiments, query system 310 (and/or ranking system 320) can refer to a back end of system 300 operated by an operator and/or administrator of system 300, and customer computers 340 and 341 can refer to a front end of system 300 used by one or more customers 350 and 351, respectively. In some embodiments, customers 350 and 351 also can be referred to as users. In many embodiments customers 350 and 351 can be referred to as users. In these or other embodiments, the operator and/or administrator of system 300 can manage query system 310, the processing module(s) of system 300, and/or the memory storage module(s) of system 300 using the input device(s) and/or display device(s) of system 300.

Meanwhile, in many embodiments, query system 310 and ranking system 320 also can be configured to communicate with one or more databases. The one or more database can comprise a product database that contains information about products sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s) and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between query system 310, ranking system 320, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
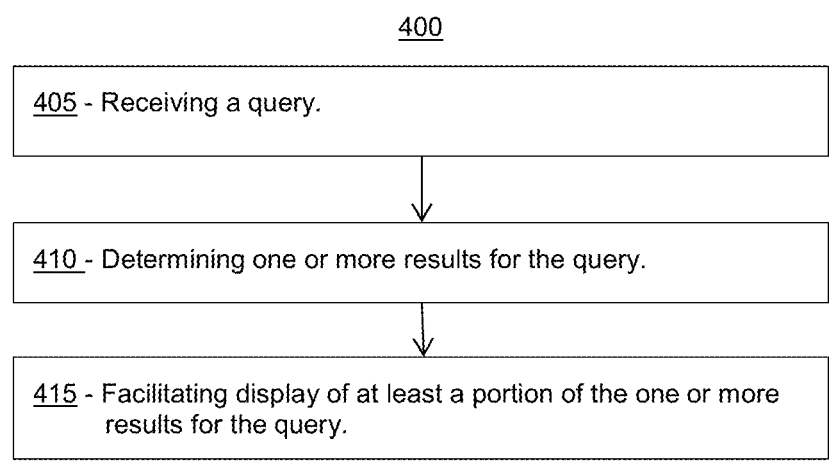
FIG. 4 illustrates a representative block diagram of a system, according to an embodiment.
Figure 7:
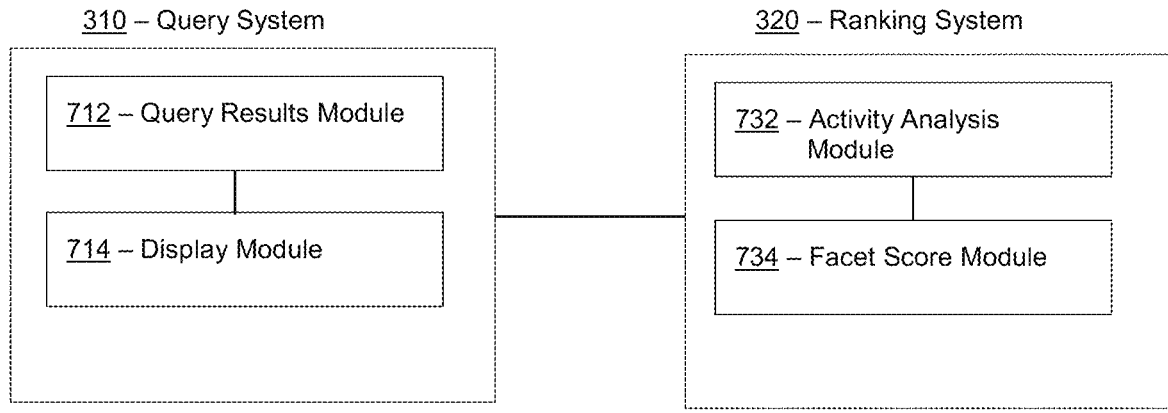
FIG. 7 illustrates a representative block diagram of a portion of the system according to FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 712, 714, 732, or 734 (FIG. 7). Such non-transitory memory storage modules can be part of a computer system such as query system 310 (FIG. 3) and/or ranking system 320 (FIG. 3). The processing module(s) can be similar or identical to the processing module(s) described above with respect to computer system 100 (FIG. 1).

Method 400 can comprise an activity 405 of receiving a query. In some embodiments, the query can be received from a user or a customer, such as customer 350 (FIG. 3). In many embodiments, the query can be a search for a distinct item (e.g. SKU) or a description of an item, such as a query for "high definition televisions." In some embodiments, the query can include a brand name or other characteristic such as size, weight, or color.

Method 400 can further comprise an activity 410 of determining one or more results for the query. In many embodiments, the one or more results can comprise one or more shelves. In various embodiments, the one or more shelves can be accessible through browsing an eCommerce website without typing a search query. In some embodiments, the one or more shelves can be accessible from a page of the eCommerce website. In some embodiments, the one or more shelves can be accessed by clicking on categories. For example, each of the following hierarchy of categories is a shelf that can be accessed by clicking on each category: "Departments"→"Electronics"→"Computers"→"Laptops." In many embodiments a shelf can also be referred to as a browse shelf. In a number of embodiments, each shelf of the one or more shelves can comprise one or more facets. Facets are a collection of filters, or facet values, that can be used by a user or a customer (e.g., customer 350 (FIG. 3)) to narrow down a search result accord to interests of the customer. In many embodiments, the filters or facet values are categories that describe characteristics of an item (e.g., a SKU) or a group of items and/or different shipping or delivery options. In some embodiments, the filters or facet values can be individual filters for a particular facet, such as "HP," "Dell," or "Toshiba" for the "Laptop" shelf example above. When a customer or user clicks on the filter or facet value, only the results (e.g., items or SKUs) that contain the facet value are returned. In many embodiments, the narrowing down of the search results can improve item discoverability, minimize user or customer effort, and improve business metrics. In the "Laptop" shelf example above, facets can comprise "pickup and delivery," "screen size," "operating system," which can be displayed on the browse page of the eCommerce website. In many embodiments, each of the one or more facets comprising one or more items (e.g., SKUs).

Figure 8:
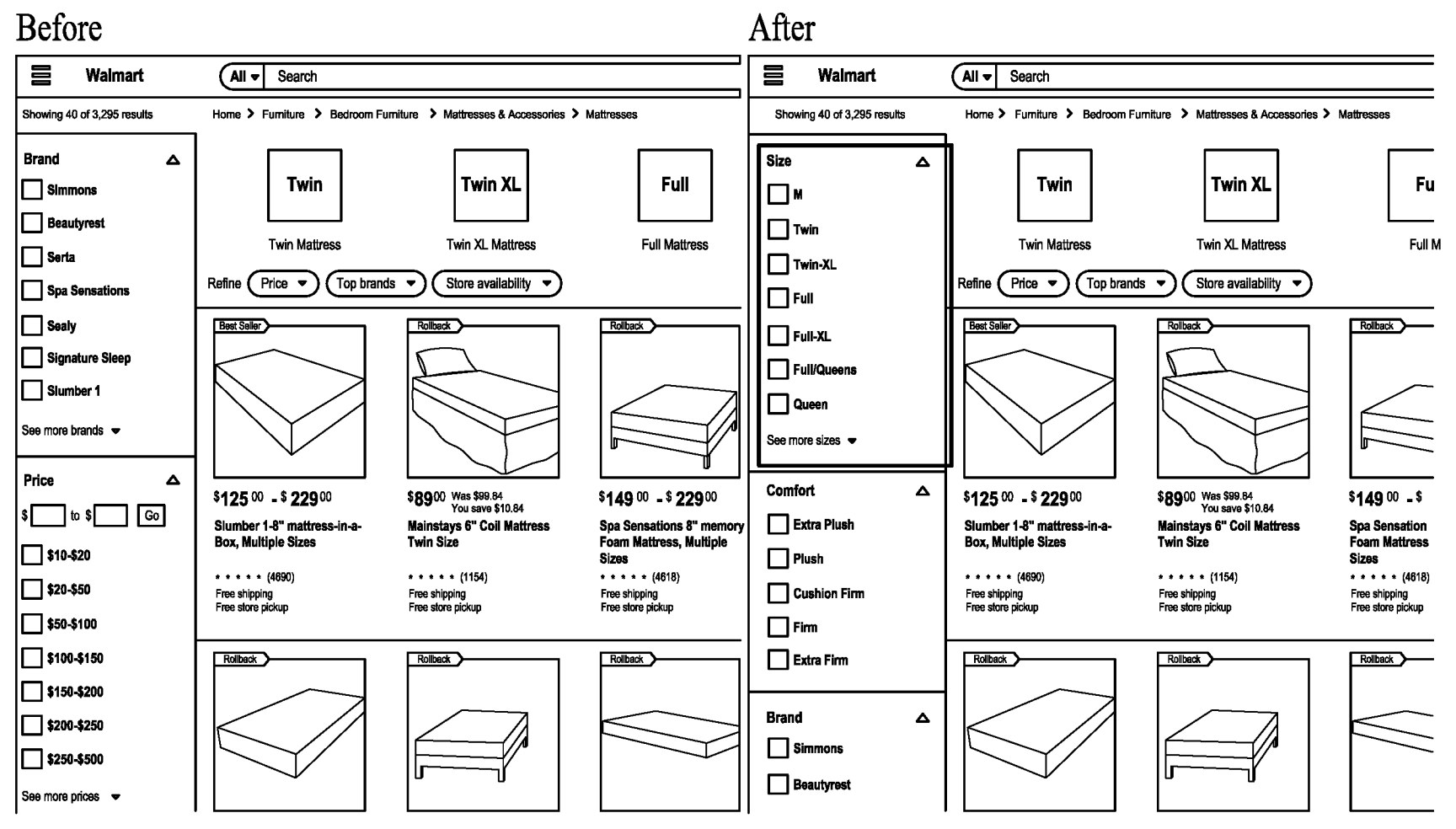

In a number of embodiments, method 400 also can comprise an activity 415 of facilitating display of at least a portion of the one or more results for the query. In some embodiments, activity 415 of facilitating display of at least a portion of the one or more results for the query can comprise facilitating display of at least the portion of the one or more results in a ranked order. In many embodiments, facilitating display of at least the portion of the one or more results in a ranked order can comprise facilitating display based at least in part on method 500 of FIG. 5. In many embodiments, the ranked order of the one or more results can provide increased facet click engagement. Turning ahead in the drawings, FIG. 8 shows a before view of a browse page of an eCommerce website on the left and an after view of a browse page of the eCommerce website on the right. The before view shows manually ordered facets, while the after view depicts a ranked order of the facets. Testing showed an increase of facet click engagement, as measured by counting facet clicks, item clicks, items added to a checkout cart, and items ordered. In some testing, the increase of facet click engagement was approximately fifteen to sixteen percent (15%-16%).

Figure 5:
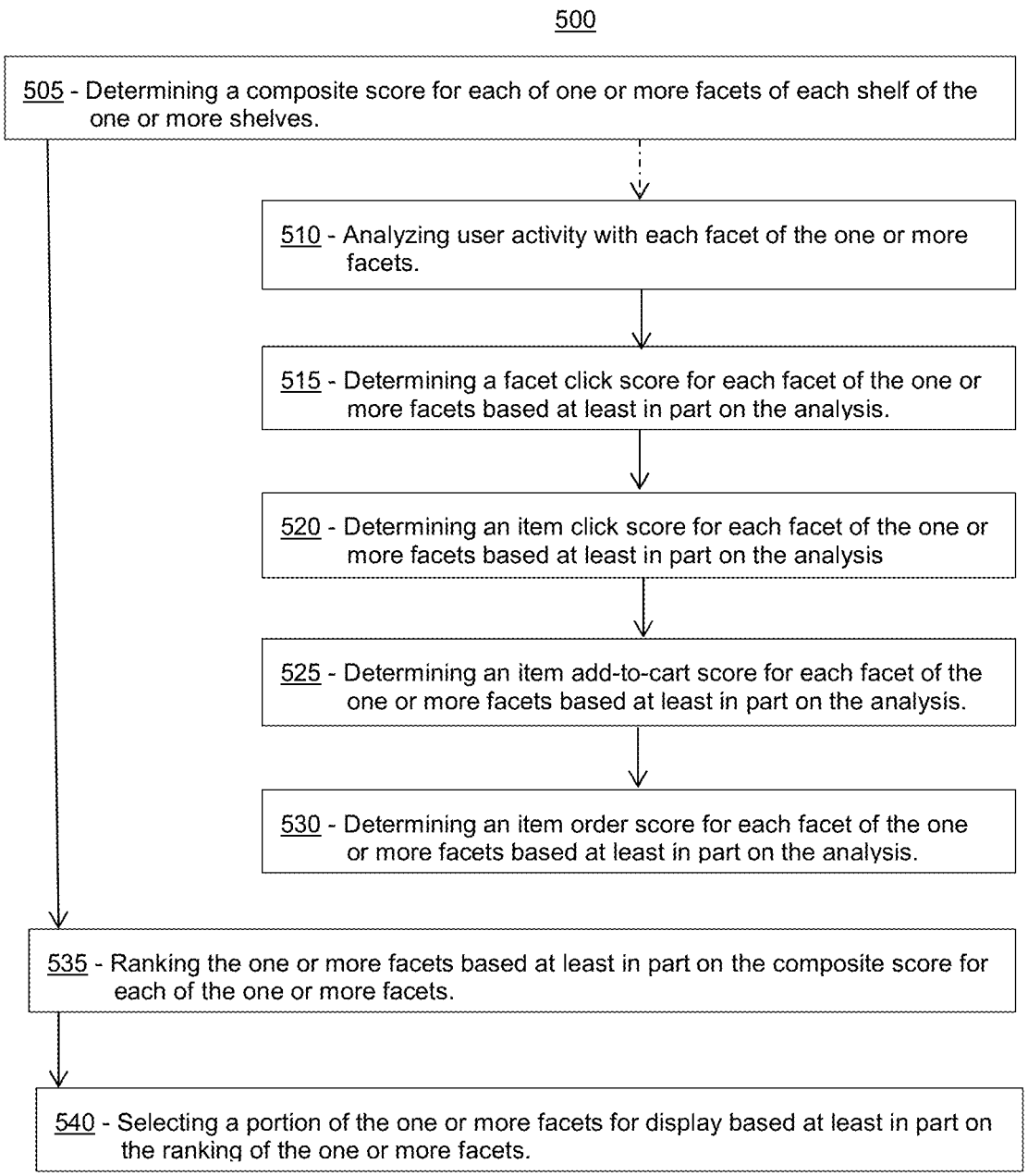
FIG. 5 is a flowchart for a method, according to an embodiment.

Turning back in the drawings, FIG. 5 illustrates a flow chart for a method 500, according to another embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 712, 714, 732, or 734 (FIG. 7). Such non-transitory memory storage modules can be part of a computer system such as query system 310 (FIG. 3) and/or ranking system 320 (FIG. 3). The processing module(s) can be similar or identical to the processing module(s) described above with respect to computer system 100 (FIG. 1).

In many embodiments, method 500 can comprise an activity 505 of determining a composite score for each of one or more facets of each shelf of the one or more shelves. In many embodiments, activity 505 of determining the composite score for each of the one or more facets of each shelf of the one or more shelves can comprise an activity 510 of analyzing user activity with each facet of the one or more facets. In many embodiments, analyzing user activity with each facet of the one or more facets can comprise tracking the user or customer (e.g., customer 350 (FIG. 3)) interaction with the facets on a browse page of the eCommerce website.

In some embodiments, activity 505 of determining the composite score for each of the one or more facets of each shelf of the one or more shelves can further comprise an activity 515 of determining a facet click score for each facet of the one or more facets based at least in part on the analysis. In many embodiments, activity 515 of determining the facet click score can comprise determining a facet click count. A facet click count is an interaction by users or customers (e.g., customers 350 and/or 351 (FIG. 3) with the browse page of the eCommerce website wherein the customer clicks on a facet value or filter. In some embodiments, a click on any of the facet values or filters can result in an increase in the facet click count. In some embodiments, a click on any of the facet values of the facet "brand" can be considered a click on the facet "brand" (e.g., clicking on "SAMSUNG 40" Television Model #10").

In many embodiments, activity 505 of determining the composite score for each of the one or more facets of each shelf of the one or more shelves can further comprise an activity 520 of determining an item click score for each facet of the one or more facets based at least in part on the analysis. In many embodiments, activity 520 of determining the item click score can comprise determining an item click count and an item click weight. In some embodiments, determining the item click count can comprise counting an aggregate of each click on an item (e.g., SKU) by users after a click on one of the one or more facets (e.g., customer first clicks on facet "brand" and then clicks on "SAMSUNG 40" Television Model #10"). In various embodiments, the item click weight can comprise a constant that can be the same or different for every shelf and facet. In many embodiments, the item click weight can be tuned according to an evaluation procedure discussed further below.

In some embodiments, activity 505 of determining the composite score for each of the one or more facets of each shelf of the one or more shelves can further comprise an activity 525 of determining an item add-to-cart score for each facet of the one or more facets based at least in part on the analysis. In many embodiments, determining an item add-to-cart score can comprise determining an item add-to-cart count and an item add-to-cart weight. In some embodiments, determining the item add-to-cart count can comprise counting an aggregate of each instance a user or customer adds an item (e.g., SKU) to a checkout cart. In some embodiments, determining the add-to-cart count can comprise counting an aggregate of each instance an item (e.g., SKU) was added to the checkout cart by users after a click on one of the one or more facets (e.g., customer first clicks on facet "brand" and then adds "SAMSUNG 40" Television Model #10" to the checkout cart). In various embodiments, the item add-to-cart weight can comprise a constant that can be the same or different for every shelf and facet. In many embodiments, the item add-to-cart weight can be tuned according to an evaluation procedure discussed further below.

In some embodiments, activity 505 of determining the composite score for each of the one or more facets of each shelf of the one or more shelves can further comprise an activity 530 of determining an item order score for each facet of the one or more facets based at least in part on the analysis. In many embodiments, determining an item order score can comprise determining an item order count and an item order weight. In some embodiments, determining the item order count can comprise counting an aggregate of each instance a user or customer completes the check-out process, confirms item pick-up or delivery, and/or orders an item (e.g., SKU). In some embodiments, determining the item order count can comprise counting an aggregate of each instance an item (e.g., SKU) was ordered by users after a click on one of the one or more facets (e.g., customer first clicks on facet "brand" and then completes ordering of "SAMSUNG 40" Television Model #10"). In various embodiments, the item order weight can comprise a constant that can be the same or different for every shelf and facet. In many embodiments, the item order weight can be tuned according to an evaluation procedure discussed further below.

In various embodiments, the facet click count, the item click count, the item add-to-cart count, and the item order count can be determined over a time period. In some embodiments, the time period can be daily, weekly, 30 days, monthly, quarterly, and/or yearly. In many embodiments, the facet click weight, each of the item click weight, the item add-to-cart weight, and the item order weight can be fixed for each facet of the one or more facets, or such weights can vary for each facet.

In many embodiments, activity 505 of determining the composite score for each of the one or more facets of each shelf of the one or more shelves can comprise determining the composite score for each of the one or more facets by the following Formula 1:

$$\text{Score}(i) = x_0 + a_1 x_1 + a_2 x_2 + a_3 x_3 \quad \text{(Formula 1)}$$

In Formula 1, i is a facet of the one or more facets, $x_0$ is the facet click count, $a_1$ is the item click weight, $x_1$ is the item click count, $a_2$ is the item add-to-cart weight, $x_2$ is the item add-to-cart count, $a_3$ is the item order weight, and $x_3$ is the item order count. In many embodiments, $x_0$, $x_2$, and $x_3$ can vary for each shelf and/or each facet.

In some embodiments, $a_1$, $a_2$, and $a_3$ can be constants that can be the same for every shelf and/or every facet. In some embodiments, $a_1$, $a_2$, and $a_3$ can be tuned manually. In one embodiment, $a_1$, $a_2$, and $a_3$ can be tuned manually by implementing the ranking for $a_1$, $a_2$, and $a_3$ to each be equal to "0" initially. One or more evaluators can then evaluate the one or more facets for one or more shelves of each of the one or more facets. In some embodiments, the one or more evaluators can randomly select one or more shelves for evaluation. In some embodiments, the selected one or more shelves can be selected based at least in part on popularity of the one or more shelves. In many embodiments, for each shelf of the selected one or more shelves, the one or more evaluators assign an integer score from −2 to +2, wherein −2 denotes an irrelevant facet and +2 denotes a relevant facet. In some embodiments, a normalized discounted cumulative gain (NDCG) can be calculated for each shelf of the one or more shelves based at least in part on the assigned integer score. In some embodiments, a fixed mapping of assigned integer scores to the NDCG can be defined, such that: g(−2)=0; g(−1)=1; g(0)=3; g(1)=10.5; and g(2)=15.

The NDCG of a shelf can be determined by Formula 2:

$$NDCG = \frac{\sum_{i=1}^{P} \frac{g(\text{eval\_score}(i))}{\log_2(1 + (r(i)))}}{\sum_{i=1}^{P} \frac{g(2)}{\log_2(1 + r(i))}} \quad \text{(Formula 2)}$$

In Formula 2, P is a number of facets displayed in the shelf, i is the index of the facet of the one or more facets, r(i) is a current rank of the facet of the one or more facets according to score(i), g(eval_score(i)) is an assigned integer score for the facet of the one or more facets, and g(2) is a maximum possible assigned score for any facet of the one or more facets. In many embodiments, an average NDCG across the evaluated shelves by taking the mean of the NDCG values. In many embodiments, $a_1$, $a_2$, and $a_3$ (item click weight, item add-to-cart weight, and item order weight) can be optimized. In some embodiments, $a_1$, $a_2$, and $a_3$ can be optimized to maximize the NDCG for the shelf. In many embodiments, a weighed position score for a facet i can be determined according to the $$\frac{g(\text{eval\_score}(i))}{\log_2(1 + (r(i)))}$$

portion of Formula 2.

After computing the NDCG score for all the shelves evaluated by the one or more evaluators, the average NDGC can be determined. In many embodiments, any of the weight parameters $a_1$, $a_2$, and $a_3$ can be optimized. In some embodiments, at least two of weight parameters $a_1$, $a_2$, and $a_3$ can be jointly optimized. In many embodiments, weight parameters $a_1$, $a_2$, and $a_3$ can be optimized individually. For example, the item order weight, $a_3$ can be optimized by maximizing the average NDGC score. Any iterative optimization technique can be used for this optimizing any of the weight parameters, or the optimization can be done manually. In some embodiments, a gradient descent and/or a pattern search can be used. In some embodiments, a new $a_3$ can be selected; an updated rank based on the new $a_3$ can be determined; and an updated average NDGC based on the new $a_3$ can be determined.

In some embodiments, method 500 can further comprise an activity 535 of ranking the one or more facets based at least in part on the composite score for each of the one or more facets. In a number of embodiments, method 500 can further comprise an activity 540 of selecting a portion of the one or more facets for display based at least in part on the ranking of the one or more facets. In many embodiments, the one or more facets can be ranked and at least a portion displayed in descending order of the composite score for each shelf. In other embodiments, the one or more facets can be ranked and at least a portion displayed in ascending order of the composite score for each shelf. In some embodiments, particular facets (e.g., "sale" or "delivery" facets) can be displayed before the ranked order of the one or more facets. In other embodiments, the facet with the highest score is always displayed at the top of the list of the one or more facets.

The following exemplary embodiment shows a process of assigning a value to $a_3$. In this example $a_3$ is initially selected to be equal to 0, and only facet clicks ($x_0$) and item orders ($x_3$) are considered. Assuming, for a particular shelf, the past time period is 30 days (n=30). The aggregation of facet clicks and post facet click orders are as follows in Table 1:

TABLE 1

| Facet (i) | (x0) Facet clicks | (x3) Post facet click orders | Score(i) (x0 + x3 * a3) | Rank (r(i)) |
|---|---|---|---|---|
| Brand | 6758 | 57 | 6758 | 4 |
| Condition | 7053 | 2 | 7053 | 3 |
| Operating system | 10295 | 39 | 10295 | 2 |
| Price | 2051 | 33 | 2051 | 6 |
| Laptop Screen Size | 12798 | 46 | 12798 | 1 |
| Category | 3000 | 0 | 3000 | 5 |

It can be seen that, because $a_3=0$, the facets are ranked by the facet clicks only, and can be displayed in the order of the rank.

The information can be sent to the one or more evaluators, who provide the integer score between −2 and 2 based at least in part on an analysis of the relevance of each facet of the one or more facets. Based at least in part on the integer scores provided by the one or more evaluators, the NDCG scores can be determined according to mapping g(i) on the fourth column of Table 2 below. Then, the weighed position score can be determined as shown in the fifth column of Table 2. Column 6 of Table 2 provides a preferred position weighted NDCG score (when a facet evaluation integer score is +2). The NDCG score for the shelf is the ratio of the sum of columns 5 and 6 below, which is equal to 0.73.

TABLE 2

| Facet (i) | Rank (r(i)) | eval_score(i) | g(i) | $\frac{g(eval\_score(i))}{\log_2(1 + r(i))}$ | $\frac{g(2)}{\log_2(1 + r(i))}$ |
|---|---|---|---|---|---|
| Brand | 4 | 2 | 15 | 6.460148371 | 6.460148371 |
| Condition | 3 | 0 | 3 | 1.5 | 7.5 |
| Operating system | 2 | 2 | 15 | 9.463946304 | 9.463946304 |
| Price | 6 | 1 | 10.5 | 3.740175465 | 5.343107807 |
| Laptop Screen Size | 1 | 2 | 15 | 15 | 15 |
| Category | 5 | −2 | 0 | 0 | 5.802792109 |

As discussed above, after computing the NDCG score for all the shelves evaluated by the one or more evaluators, the average NDGC can be determined. The item order weight, $a_3$ can be optimized by maximizing the average NDGC score. A new $a_3$ can be selected, an updated rank based on the new $a_3$ can be determined, and an updated average NDGC based on the new $a_3$ can be determined. If $a_3$ is selected to be 300, the ranks can be updated as follows in Table 3:

TABLE 3

| | Facet (i) | | | |
|---|---|---|---|---|
| | (x0) Facet clicks | (x3) Post facet click orders | Score(i) (x0 + x3 * a3) | Rank (r(i)) |
| Brand | 6758 | 57 | 23858 | 2 |
| Condition | 7053 | 2 | 7653 | 5 |
| Operating system | 10295 | 39 | 21995 | 3 |
| Price | 2051 | 33 | 11951 | 4 |
| Laptop Screen Size | 12798 | 46 | 26598 | 1 |
| Category | 3000 | 0 | 3000 | 6 |

In Table 3, it can be seen that the ranking for some facets changed (e.g., ranking for "Condition" decreased from 3 in Table 2 to 5 in Table 3). The NDCG can then be updated based at least in part on the updated ranks, as shown in Table 4.

TABLE 4

| Facet (i) | Rank (r(i)) | eval_score(i) | g(i) | $\frac{g(eval\_score(i))}{\log_2(1 + r(i))}$ | $\frac{g(2)}{\log_2(1 + r(i))}$ |
|---|---|---|---|---|---|
| Brand | 2 | 2 | 15 | 9.463946304 | 9.463946304 |
| Condition | 5 | 0 | 3 | 1.160558422 | 5.802792109 |

TABLE 4-continued

| Facet (i) | Rank (r(i)) | eval_score(i) | g(i) | $\frac{g(\text{eval\_score}(i))}{\log_2(1 + r(i))}$ | $\frac{g(2)}{\log_2(1 + r(i))}$ |
|---|---|---|---|---|---|
| Operating system | 3 | 2 | 15 | 7.5 | 7.5 |
| Price | 4 | 1 | 10.5 | 4.52210386 | 6.460148371 |
| Laptop Screen Size | 1 | 2 | 15 | 15 | 15 |
| Category | 6 | −2 | 0 | 0 | 5.343107807 |

It can be seen that the updated NDCG (the ratio of sum of the 5th and 6th columns above) for this shelf increased from 0.73 to 0.76.

Figure 6:
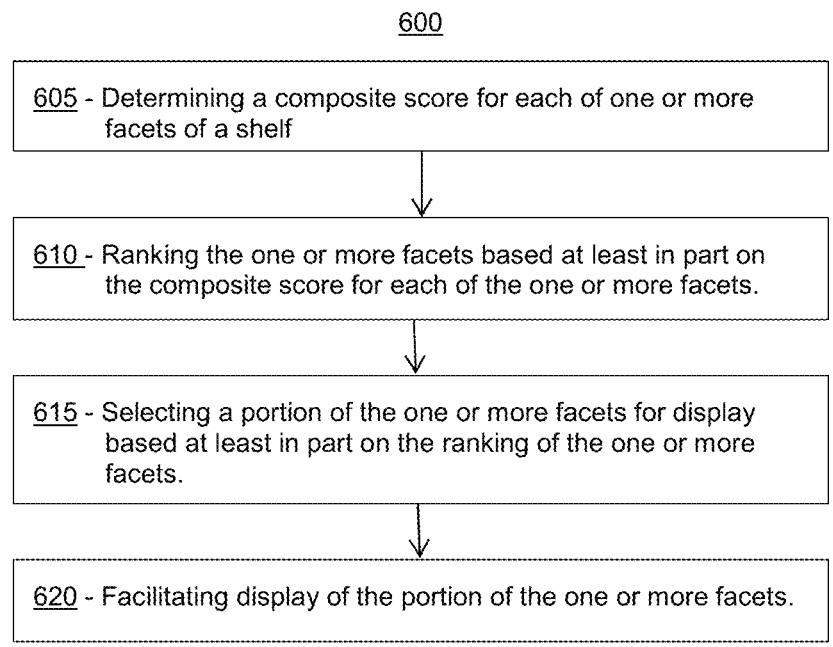
FIG. 6 illustrates a flowchart for a method, according to another embodiment.

Turning ahead in the drawings, FIG. 6 illustrates a flow chart for a method 600, according to another embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules 712, 714, 732, or 734 (FIG. 7. Such non-transitory memory storage modules can be part of a computer system such as query system 310 (FIG. 3) and/or ranking system 320 (FIG. 3). The processing module(s) can be similar or identical to the processing module(s) described above with respect to computer system 100 (FIG. 1). In some embodiments, method 600 can be similar to method 400.

In many embodiments, method 600 can comprise an activity 605 of determining a composite score for each of one or more facets of a shelf. In many embodiments, activity 605 of determining a composite score for each of one or more facets of a shelf can comprise analyzing user activity with each facet of the one or more facets, determining a facet click score for each facet of the one or more facets based at least in part on the analysis, determining an item click score for each facet of the one or more facets based at least in part on the analysis, determining an item add-to-cart score for each facet of the one or more facets based at least in part on the analysis, and determining an item order score for each facet of the one or more facets based at least in part on the analysis. In some embodiments, determining the facet click score can comprise determining a facet click count, determining the item click score can comprise determining an item click count and an item click weight, determining the item add-to-cart score can comprise determining an item add-to-cart count and an item add-to-cart weight, and determining the item order score can comprise determining an item order count and an item order weight. In many embodiments, the item click count, item click weight, item add-to-cart count, item add-to-cart weight, item order count, and item order weight can be determined similar to as discussed above. In some embodiments, the facet click weight, the item click weight, the item add-to-cart weight, and the item order weight are each fixed for each facet of the one or more facets. In some embodiments, activity 605 can be similar to activity 505 (FIG. 5), and vice versa.

In many embodiments, method 600 can further comprise an activity 610 of ranking the one or more facets based at least in part on the composite score for each of the one or more facets. In some embodiments, determining the composite score for each of the one or more facets can comprise determining the composite score for each of the one or more facets by Formula 1 as discussed above. In some embodiments, method 600 can further comprise optimizing the item click weight, the item add-to-cart weight, and the item order weight to maximize a NDCG for the shelf. Similarly as discussed above, the NDCG can be determined according to Formula 2 and iteratively optimized. In some embodiments, activity 610 can be similar to activity 535 (FIG. 5), and vice versa.

In various embodiments, method 600 can further comprise an activity 615 of selecting a portion of the one or more facets for display based at least in part on the ranking of the one or more facets. In some embodiments, activity 615 can be similar to activity 540 (FIG. 5), and vice versa. In some embodiments, method 600 also can comprise activity 620 of facilitating display of at least the portion of the one or more facets.

FIG. 7 illustrates a block diagram of a portion of system 300 comprising query system 310 and ranking system 320, according to the embodiment shown in FIG. 3. Query system 310 and ranking system 320 each are merely exemplary and are not limited to the embodiments presented herein. Query system 310 and ranking system 320 each can be employed in many different embodiments or examples not specifically depicted or described herein. In some embodiments, certain elements or modules of query system 310 and ranking system 320 can perform various procedures, processes, and/or acts. In other embodiments, the procedures, processes, and/or acts can be performed by other suitable elements or modules.

In many embodiments, query system 310 can comprise non-transitory memory storage modules 712 and 714, and ranking system 320 can comprise non-transitory memory storage modules 732 and 734. Memory storage module 712 can be referred to as a query results module 712, and memory storage module 714 can be referred to as a display module 714. Memory storage module 732 can be referred to as an activity analysis module 732, and memory storage module 734 can be referred to as a facet storage module 734. In many embodiments, query results module 712 can store computing instructions configured to run on one or more processing modules and perform one or more acts of methods 400 (FIG. 4), 500 (FIG. 5), and/or 600 (FIG. 6) (e.g., act 405 of receiving a query (FIG. 4). In some embodiments, display module 714 can store computing instructions configured to run on one or more processing modules and perform one or more acts of methods 400 (FIG. 4), 500 (FIG. 5), and/or 600 (FIG. 6) (e.g., act 415 of facilitating display of at least a portion of the one or more results for the query (FIG. 4) and/or act 540 of selecting a portion of the one or more facets for display based at least in part on the ranking of the one or more facets). In many embodiments, activity analysis module 732 can store computing instructions configured to run on one or more processing modules and perform one or more acts of methods 400 (FIG. 4), 500 (FIG. 5) and/or 600 (FIG. 6) (e.g., act 510 of analyzing user activity with each facet of the one or more facets (FIG. 5)). In some embodiments, facet score module 734 can store computing instructions configured to run on one or more processing modules and perform one or more acts of methods 400 (FIG. 4), 500 (FIG. 5) and/or 600 (FIG. 6) (e.g., act 515 of determining a facet click score for each facet of the one or more facets based at least in part on the analysis (FIG. 5)).

Although systems and methods for browse facet ranking has been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the activities or modules of FIGS. 3-7 may include different activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
receiving a query;
determining one or more results for the query, the one or more results comprising one or more shelves, each respective shelf of the one or more shelves comprising one or more respective facets, wherein the one or more respective facets comprise one or more respective facet values, wherein the one or more respective facet values comprise respective categories that describe respective characteristics of one or more items;
determining a respective composite score for each respective facet of the one or more respective facets of the each respective shelf of the one or more shelves by:
performing an analysis of at least one respective user activity associated with the each respective facet of the one or more respective facets;
customizing a respective weight parameter associated with each of the at least one respective user activity based at least in part on the analysis, wherein the respective weight parameter associated with the each of the at least one respective user activity comprises a respective item click weight, a respective item add-to-cart weight, and a respective item order weight;
assigning a fixed weight for at least the respective item click weight, the respective item add-to-cart weight, and the respective item order weight for the each respective facet of the one or more respective facets of the each respective shelf;
determining a respective facet click count for the each respective facet of the one or more respective facets based at least in part on the analysis;
determining a respective facet click score for the each respective facet of the one or more respective facets based at least in part on the analysis and the respective facet click count;
determining a respective item click score for the each respective facet of the one or more respective facets based at least in part on the analysis;
determining a respective item add-to-cart score for the each respective facet of the one or more respective facets based at least in part on the analysis; and
determining a respective item order score for the each respective facet of the one or more respective facets based at least in part on the analysis;
adjusting the respective weight parameter associated with the each of the at least one respective user activity to zero to prevent the one or more respective facets of the each of the at least one respective user activity from being displayed;
ranking the one or more respective facets of the each respective shelf based at least in part on the respective composite score for the each respective facet of the one or more respective facets of the each respective shelf;
selecting at least a portion of the one or more respective facets of the each respective shelf for display based at least in part on the ranking of the one or more respective facets of the each respective shelf;
re-arranging the at least the portion of the one or more respective facets of the each respective shelf of the one or more results from the query for display based at least in part on the ranking of the one or more respective facets of the each respective shelf; and
facilitating display of the at least the portion of the one or more respective facets, as re-arranged, of the each respective shelf of the one or more results for the query.

2. The system of claim 1, wherein:
determining the respective item click score comprises determining a respective item click count and the respective item click weight; and
determining the respective item add-to-cart score comprises determining a respective item add-to-cart count and the respective item add-to-cart weight.

3. The system of claim 2, wherein:
the respective facet click count, the respective item click count, the respective item add-to-cart count, and a respective item order count are determined over a time period.

4. The system of claim 2, wherein:
determining the respective item order score comprises determining the respective item order count and the respective item order weight.

5. The system of claim 2, wherein:
determining the respective item click count comprises counting an aggregate of each respective click on a respective item by one or more users after a respective click on one of the one or more respective facets of the each respective shelf by the one or more users.

6. The system of claim 2, wherein:
determining the respective composite score for the each respective facet of the one or more respective facets of the each respective shelf comprises determining the respective composite score for the each respective facet of the one or more respective facets of the each respective shelf by a formula:

$$\text{Score}(i) = x_0 + a_1 x_1 + a_2 x_2 + a_3 x_3$$

wherein:
i is a respective facet of the one or more respective facets of the each respective shelf;
$x_0$ is the respective facet click count;
$a_1$ is the respective item click weight;
$x_1$ is the respective item click count;
$a_2$ is the respective item add-to-cart weight;
$x_2$ is the respective item add-to-cart count;
$a_3$ is the respective item order weight; and
$x_3$ is the respective item order count.

7. A method being implemented via execution of computing instructions configured to run at one or more processors and stored at one or more non-transitory computer readable media, the method comprising:
receiving a query;
determining one or more results for the query, the one or more results comprising one or more shelves, each respective shelf of the one or more shelves comprising one or more respective facets, wherein the one or more respective facets comprise one or more respective facet values, wherein the one or more respective facet values comprise respective categories that describe respective characteristics of one or more items;
determining a respective composite score for each respective facet of the one or more respective facets of the each respective shelf of the one or more shelves by:
performing an analysis of at least one respective user activity associated with the each respective facet of the one or more respective facets;
customizing a respective weight parameter associated with each of the at least one respective user activity based at least in part on the analysis, wherein the respective weight parameter associated with the each of the at least one respective user activity comprises a respective item click weight, a respective item add-to-cart weight, and a respective item order weight;
assigning a fixed weight for at least the respective item click weight, the respective item add-to-cart weight, and the respective item order weight for the each respective facet of the one or more respective facets of the each respective shelf;
determining a respective facet click count for the each respective facet of the one or more respective facets based at least in part on the analysis;
determining a respective facet click score for the each respective facet of the one or more respective facets based at least in part on the analysis and the respective facet click count;
determining a respective item click score for the each respective facet of the one or more respective facets based at least in part on the analysis;
determining a respective item add-to-cart score for the each respective facet of the one or more respective facets based at least in part on the analysis; and
determining a respective item order score for the each respective facet of the one or more respective facets based at least in part on the analysis,
adjusting the respective weight parameter associated with the each of the at least one respective user activity to zero to prevent the one or more respective facets of the each of the at least one respective user activity from being displayed;
ranking the one or more respective facets of the each respective shelf based at least in part on the respective composite score for the each respective facet of the one or more respective facets of the each respective shelf;
selecting at least a portion of the one or more respective facets of the each respective shelf for display based at least in part on the ranking of the one or more respective facets of the each respective shelf;
re-arranging the at least the portion of the one or more respective facets of the each respective shelf of the one or more results from the query for display based at least in part on the ranking of the one or more respective facets of the each respective shelf; and
facilitating the display of the at least the portion of the one or more respective facets, as re-arranged, of the each respective shelf of the one or more results for the query by facilitating the display of the at least the portion of the one or more results.

8. The method of claim 7, wherein:
determining the respective item click score comprises determining a respective item click count and the respective item click weight; and
determining the respective item add-to-cart score comprises determining a respective item add-to-cart count and the respective item add-to-cart weight.

9. The method of claim 8, wherein:
the respective facet click count, the respective item click count, the respective item add-to-cart count, and a respective item order count are determined over a time period.

10. The method of claim 8, wherein:
determining the respective item order score comprises determining the respective item order count and the respective item order weight.

11. The method of claim 8, wherein:
determining the respective item click count comprises counting an aggregate of each respective click on a respective item by one or more users after a respective click on one of the one or more respective facets of the each respective shelf by the one or more users.

12. The method of claim 8, wherein:
determining the respective composite score for the each respective facet of the one or more respective facets of the each respective shelf comprises determining the respective composite score for the each respective facet of the one or more respective facets of the each respective shelf by a formula:

$$Score(i) = x_0 + a_1x_1 + a_2x_2 + a_3x_3$$

wherein:
 i is a respective facet of the one or more respective facets of the each respective shelf;
 $x_0$ is the respective facet click count;
 $a_1$ is the respective item click weight;
 $x_1$ is the respective item click count;
 $a_2$ is the respective item add-to-cart weight;
 $x_2$ is the respective item add-to-cart count;
 $a_3$ is the respective item order weight; and
 $x_3$ is the respective item order count.

13. The method of claim 12, further comprising:
 optimizing the respective item click weight, the respective item add-to-cart weight, and the respective item order weight to maximize a normalized discounted cumulative gain (NDCG) for the each respective shelf.

14. The method of claim 13, wherein:
the NDCG is determined by a formula:

$$NDCG = \frac{\sum_{i=1}^{P} \frac{g(eval\_score(i))}{\log_2(1+(r(i)))}}{\sum_{i=1}^{P} \frac{g(2)}{\log_2(1+r(i))}}$$

wherein:
 P is a number of the one or more respective facets displayed in the each respective shelf;
 i is an index of the respective facet of the one or more respective facets;
 r(i) is a current rank of the respective facet of the one or more respective facets of the each respective shelf according to score(i);
 g(eval_score(i)) is an assigned score for the respective facet of the one or more respective facets of the each respective shelf; and
 g(2) is a maximum possible assigned score for any respective facet of the one or more respective facets of the each respective shelf.

15. A method being implemented via execution of computing instructions configured to run at one or more processors and stored at one or more non-transitory computer readable media, the method comprising:
 determining a respective composite score for each respective facet of one or more respective facets of each respective shelf of one or more shelves by:
  performing an analysis of at least one respective user activity associated with the each respective facet of the one or more respective facets;
  customizing a respective weight parameter associated with each of the at least one respective user activity based at least in part on the analysis, wherein the respective weight parameter associated with the each of the at least one respective user activity comprises a respective item click weight, a respective item add-to-cart weight, and a respective item order weight;
  assigning a fixed weight for at least the respective item click weight, the respective item add-to-cart weight, and the respective item order weight for the each respective facet of the one or more respective facets of the each respective shelf;
  determining a respective facet click count for the each respective facet of the one or more respective facets based at least in part on the analysis;
  determining a respective facet click score for the each respective facet of the one or more respective facets based at least in part on the analysis and the respective facet click count;
  determining a respective item click score for the each respective facet of the one or more respective facets based at least in part on the analysis;
  determining a respective item add-to-cart score for the each respective facet of the one or more respective facets based at least in part on the analysis; and
  determining a respective item order score for the each respective facet of the one or more respective facets based at least in part on the analysis;
 adjusting the respective weight parameter associated with the each of the at least one respective user activity to zero to prevent the one or more respective facets of the each of the at least one respective user activity from being displayed;
 ranking the one or more respective facets of the each respective shelf based at least in part on the respective composite score for the each respective facet of the one or more respective facets of the each respective shelf;
 selecting at least a portion of the one or more respective facets of the each respective shelf for display based at least in part on the ranking of the one or more respective facets of the each respective shelf;
 re-arranging the at least the portion of the one or more respective facets of the each respective shelf of one or more results from a query for display based at least in part on the ranking of the one or more respective facets of the each respective shelf; and
 facilitating display of the at least the portion of the one or more respective facets, as re-arranged, of the each respective shelf of the one or more results for the query by facilitating the display of the at least the portion of the one or more results.

16. The method of claim 15, wherein:
 determining the respective item click score comprises determining a respective item click count and the respective item click weight; and
 determining the respective item add-to-cart score comprises determining a respective item add-to-cart count and the respective item add-to-cart weight.

17. The method of claim 16, wherein:
 determining the respective item order score comprises determining a respective item order count and the respective item order weight.

18. The method of claim 16, wherein:
 determining the respective composite score for the each respective facet of the one or more respective facets of the each respective shelf comprises determining the respective composite score for the each respective facet of the one or more respective facets of the each respective shelf by a formula:

$$Score(i) = x_0 + a_1x_1 + a_2x_2 + a_3x_3$$

wherein:
 i is a respective facet of the one or more respective facets;
 $x_0$ is the respective facet click count;
 $a_1$ is the respective item click weight;
 $x_1$ is the respective item click count;
 $a_2$ is the respective item add-to-cart weight;

$x_2$ is the respective item add-to-cart count;
$a_3$ is the respective item order weight; and
$x_3$ is the respective item order count.

19. The method of claim 18, further comprising:
optimizing the respective item click weight, the respective item add-to-cart weight, and the respective item order weight to maximize a normalized discounted cumulative gain (NDCG) for the each respective shelf.

20. The method of claim 19, wherein:
the NDCG is determined by a formula:

$$NDCG = \frac{\sum_{i=1}^{P} \frac{g(\text{eval\_score}(i))}{\log_2(1 + (r(i)))}}{\sum_{i=1}^{P} \frac{g(2)}{\log_2(1 + r(i))}}$$

wherein:
P is a number of the one or more respective facets displayed in the each respective shelf;
i is an index of the respective facet of the one or more respective facets of the each respective shelf;
r(i) is a current rank of the respective facet of the one or more respective facets of the each respective shelf according to score(i);
g(eval_score(1)) is an assigned score for the respective facet of the one or more respective facets of the each respective shelf; and
g(2) is a maximum possible assigned score for any respective facet of the one or more respective facets of the each respective shelf.

\* \* \* \* \*